Figure 1:
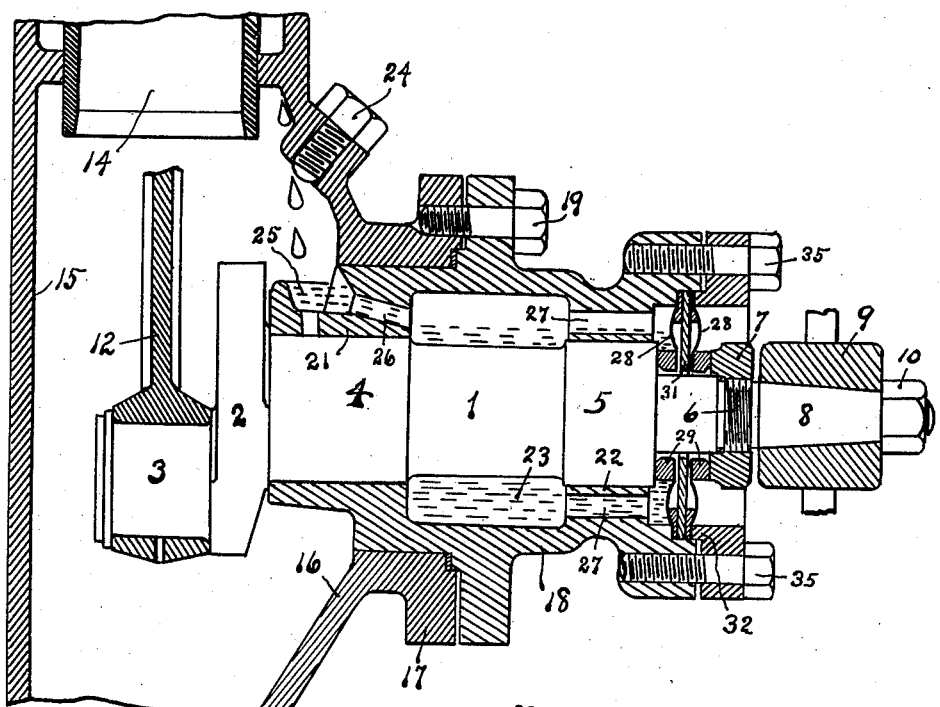

July 1, 1930.  M. LASSEN  1,769,030
SHAFT SUPPORT AND SEAL
Filed Nov. 26, 1926

Inventor
Manuel Lassen
By Edward N Pagelsen
atty.

Patented July 1, 1930

1,769,030

UNITED STATES PATENT OFFICE

MANUEL LASSEN, OF DETROIT, MICHIGAN

SHAFT SUPPORT AND SEAL

Application filed November 26, 1926. Serial No. 150,870.

This invention relates to means for mounting, lubricating and sealing crank shafts of compressors, pumps and other machines in whose crank cases pressures of more or less than atmospheric occur, and particularly crank shafts of such machines wherein the pressures within the crank cases change from sub-atmospheric to greatly above atmospheric, and its object is to provide a shaft mounting of this character which shall insure sufficient lubrication and which shall not only prevent the escape of gases from the crank case and the entrance of air thereto but will substantially prevent axial movements of the crank shaft.

The invention consists in a shaft support provided at its inner end with a receptacle for lubricant and oil passages therefrom to a plurality of bearings formed in said support, a shaft mounted in said bearings, and a seal within the outer end of the support comprising a pair of resilient discs having bearing rings at their inner edges contacting with shoulders on the shaft, the endwise movement of the shaft being limited by a rigid plate secured in the support between said resilient discs.

It further consists in the details of construction illustrated in the accompanying drawing and particularly pointed out in the claims.

In the drawing—

Figure 2:
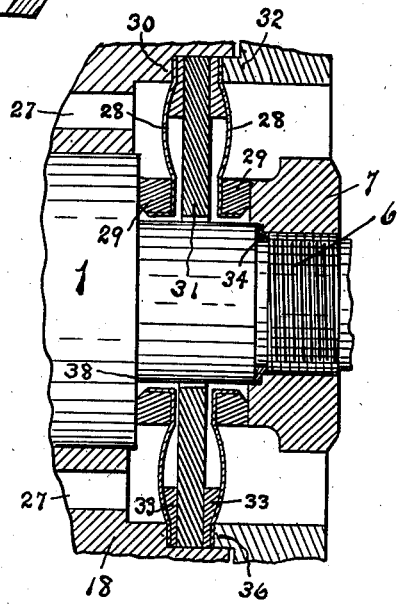

Fig. 1 is a longitudinal section of a crank shaft support embodying the present invention; and Fig. 2 is a similar view of the shaft seal on a larger scale.

Similar reference characters refer to like parts throughout the several views.

The shaft 1 is shown provided with a crank 2, crank pin 3, journals 4 and 5, a threaded portion 6 to receive the collar 7, a tapering portion 8 to receive the hub 9 of a driving member, and an outer threaded end to receive the nut 10. The connecting rod 12 on the pin 3 extends up into the cylinder 14 which is removably mounted in the casing of the compressor, this casing comprising the rear wall 15 and the front wall 16 which terminates in a hub 17.

A bearing sleeve 18 extends into this hub and is secured therein in any desired manner, screws 19 being shown. This bearing member is shown provided with bearings 21 and 22 spaced apart by the oil receptacle 23. Some of the oil splashed up by the crank and connecting rod will gather on the front wall 16 adjacent the oil-plug 24 and fall into the cup 25 from which it will pass to the receptacle 23 through passages 26 and thence to the seal chamber through passages 27.

The seal is shown on a larger scale in Fig. 2 and comprises two discs 28 of resilient metal, phosphor bronze or steel preferred, which are originally flat and have bearing rings 29 of proper composition secured to their inner edges. These resilient discs are placed between the shoulder 30 formed on the sleeve member and the collar 32. Rings 33 of lead which are originally rectangular in cross section and a steel disc 31 of great strength are placed between these rings 28. A spacing ring 34 of lead is then placed on the shaft and the collar 7 screwed down into it while the screws 35 are being turned down to force the edge 36 of the collar 32 against the outer edge of the outer resilient disc 28.

When the several parts are in final position, the lead rings 33 will have been deformed sufficiently to bulge the resilient discs 28 as shown in Fig. 2, while the collar 7, which is virtually a shoulder on the shaft, and the shoulder 38 will have pressed the bearing rings 29 toward each other. The result will be that these bearing rings will engage the collar 7 and shoulder 38 with sufficient pressure to seal the crank case while the outer edges of these resilient discs will be held leak-proof by the collar 32.

Should sufficient pressure occur at its inner end to move the shaft outward, then the inner portion of the inner disc will engage the stationary disc 31 and this inner bearing ring will limit such outward movement, while when a partial vacuum tends to cause the shaft to move inwardly, the outer resilient disc will contact with the disc 31 and the outer bearing ring 29 will limit the inward movement of the collar 7, and therefore, of the shaft. As these movements may be limited to very few thousandths of an inch by proper positioning of the collar 7 on the shaft and of the collar 32 in the bearing sleeve 18, the longitudinal movement of the shaft 1 can be equally limited, which is of great advantage. This seal is therefore adapted for use in machines in which either pressures or vacuums occur at the inner end of the shaft.

It is evident that this type of bearing and seal is adapted for other types of machines than compressors, for they can be employed wherever a shaft extends from a chamber wherein either pressures or vacuums occur.

The details of construction and the proportions of the parts may all be changed by those skilled in the art without departing from the spirit of my invention as set forth in the following claims.

I claim:—

1. A shaft and support therefor comprising a sleeve in which said shaft is journaled, said support having a chamber at one end, a collar on the shaft, said shaft having a shoulder spaced from said collar, a rigid disc and a resilient disc at each side of the rigid disc mounted in said chamber and surrounding the shaft between said collar and shoulder, bearing rings attached to the inner edge of each resilient disc and engaging said shoulder and collar, respectively, and rings of ductile metal between the outer edges of the rigid disc and resilient discs, said rings being of greater thickness along their inner peripheries so as to cause the resilient discs to bulge outwardly.

2. A shaft and a support therefor comprising a member provided with a chamber, said shaft having an annular shoulder, a collar on the shaft spaced apart from the shoulder, a pair of resilient annular discs mounted within the chamber between said shoulder and collar and a bearing ring attached to one side of each disc, one of said rings engaging said shoulder and the other said collar, substantially rigid rings between the outer portions of said discs to tension said disks outside of said bearing rings and thereby cause pressure between the bearing rings and said collar and shoulder, and a rigid annular disc positioned between the resilient discs and having its inner edge between said bearing rings to limit the longitudinal movement of the shaft.

3. A shaft and a support therefor comprising a member provided with a chamber, said shaft having an annular shoulder, a collar on the shaft spaced apart from said shoulder, a pair of resilient discs rigidly supported at their outer edges in said chamber between the shoulder and collar and a bearing ring attached to one side of each disc, one of said rings engaging said shoulder and the other said collar, and rigid rings increasing in thickness radially inwardly between the outer portions of said discs to cause them to bend so as to be substantially arc-shaped in cross section between the bearing rings and the support so as to press the bearing rings apart.

MANUEL LASSEN.